United States Patent
Waugh et al.

(10) Patent No.: US 7,652,568 B2
(45) Date of Patent: Jan. 26, 2010

(54) TRACKING OF CONTAINERS

(75) Inventors: Guy Waugh, County Kerry (IE);
Michael Fitzgerald, County Kerry (IE);
Christopher Young, Dublin (IE);
Michael Godley, County Kerry (IE);
Richard Lord, Cork (IE)

(73) Assignee: Slieve Mish Inventions Limited, County Kerry (IE)

( * ) Notice: Subject to any disclaimer, the term of this patent is extended or adjusted under 35 U.S.C. 154(b) by 237 days.

(21) Appl. No.: 11/418,109

(22) Filed: May 5, 2006

(65) Prior Publication Data

US 2006/0200560 A1 Sep. 7, 2006

Related U.S. Application Data

(63) Continuation of application No. PCT/IE2004/000155, filed on Nov. 8, 2004.

(60) Provisional application No. 60/517,864, filed on Nov. 7, 2003.

(51) Int. Cl.
*H04Q 1/30* (2006.01)
*G08B 1/08* (2006.01)

(52) U.S. Cl. ............................ 340/538.15; 340/539.13; 340/572.1

(58) Field of Classification Search ............ 340/538.15, 340/539.13, 539.16, 539.22, 539.23, 539.24, 340/539.26, 572.1–572.8; 709/224; 705/28
See application file for complete search history.

(56) References Cited

U.S. PATENT DOCUMENTS

| | | | | |
|---|---|---|---|---|
| 6,236,911 B1 * | 5/2001 | Kruger | ....................... | 340/438 |
| 6,331,825 B1 * | 12/2001 | Ladner et al. | ............... | 340/988 |
| 6,653,933 B2 * | 11/2003 | Raschke et al. | ............. | 340/332 |
| 6,674,368 B2 * | 1/2004 | Hawkins et al. | .......... | 340/572.8 |
| 6,768,994 B1 * | 7/2004 | Howard et al. | ............... | 709/218 |
| 6,847,892 B2 * | 1/2005 | Zhou et al. | ............. | 340/426.19 |
| 6,919,803 B2 * | 7/2005 | Breed | ..................... | 340/539.14 |
| 6,972,682 B2 * | 12/2005 | Lareau et al. | ............ | 340/568.1 |
| 7,133,704 B2 * | 11/2006 | Twitchell, Jr. | ............... | 455/574 |
| 7,136,832 B2 * | 11/2006 | Li et al. | ...................... | 340/505 |
| 7,260,553 B2 * | 8/2007 | Ebert | ...................... | 340/572.1 |
| 2003/0229559 A1 * | 12/2003 | Panttaja et al. | ................. | 705/36 |
| 2004/0066278 A1 * | 4/2004 | Hughes et al. | ........... | 340/572.1 |
| 2004/0178880 A1 * | 9/2004 | Meyer et al. | ............... | 340/5.22 |
| 2004/0203377 A1 * | 10/2004 | Eaton et al. | ................ | 455/41.2 |

* cited by examiner

*Primary Examiner*—Eric M Blount
(74) *Attorney, Agent, or Firm*—Jacobson Holman PLLC

(57) ABSTRACT

Monitoring device modules (10) in containers on a ship are polled by a tracking proxy (12). Monitoring data is thus captured, and the proxy 12 can ascertain in real time that the correct group of containers is present. The proxy (12) also transmits higher-value report messages with relatively low bandwidth via a satellite communication system (13) to a gateway (15). The gateway (15) routes the messages on to various systems such as tracking centers. Also, the gateway (15) regularly polls and authenticates the distributed tracking proxies (12) within its group.

5 Claims, 1 Drawing Sheet

TRACKING OF CONTAINERS

This is a continuation of PCT/IE2004/000155 filed 8 Nov. 2004 and published in English, claiming the benefit of U.S. Provisional Application No. 60/517,864 filed on 7 Nov. 2003.

INTRODUCTION

1. Field of the Invention

The invention relates to tracking of containers, such as intermodal containers.

2. Prior Art Discussion

Intermodal transport provides a transport service for goods which do not have to be unloaded and reloaded from their container when switching from one mode of transport to another. For example, a container carrying fruit may be packed in one country, loaded onto a ship, then a train, then delivered to its destination on a truck without having to be unpacked and repacked.

Recent growth in the intermodal container transport market has led to increasing levels of theft, lost containers, delayed containers and a perception that containers could be used by terrorists to smuggle weapons into a country.

The definition of container in this document is not limited to standard intermodal containers (typically 20 ft, 40 ft and 45 ft length) but could also include other types of container and transport vehicles such as trucks and trailers.

US20030038172 describes a system for tracking items such as intermodal containers. It identifies objects and interactions among objects. RFID tags are used to identify the items.

The invention is directed towards providing improved tracking of containers.

SUMMARY OF THE INVENTION

According to the invention, there is provided a tracking system comprising a tracking proxy, said proxy comprising:
- a local area interface for communicating with at least one container monitoring device in a wireless local area associated with the proxy;
- a processor for receiving monitoring device data and using it to generate a report message, and
- a remote communication interface for uploading the report message to a remote host.

In one embodiment, the processor inserts geographical location data in the report messages.

In another embodiment, the system further comprises a location monitoring device, and the processor determines said location data using inputs from the location monitoring device.

In a further embodiment, the processor parses monitoring device data to detect specific events and generates notifications accordingly, and inserts said notifications in the report messages.

In one embodiment, the local area interface communicates with monitoring devices, each of which in turn communicates with electronic tags.

In another embodiment, the local area interface communicates with said monitoring devices using a mobile network protocol.

In a further embodiment, the protocol uses SMS.

In one embodiment, the processor reads container identifiers from monitoring device data.

In another embodiment, the processor performs bi-directional communication with a monitoring device.

In a further embodiment, the processor interrogates a monitoring device to determine status data.

In one embodiment, the processor performs remote configuration of a monitoring device.

In another embodiment, the local area interface receives inputs from a craft system, the processor determines information on craft system and location, and the processor inserts said information in the report messages.

In a further embodiment, the processor determines valid container monitoring devices according to an electronic manifest.

In one embodiment, the proxy exchanges heartbeat messages with container monitoring devices to detect communication errors, and inserts data on detected errors in the report messages.

In another embodiment, the processor treats absence of a response to a polling message as a communication error.

In a further embodiment, the processor includes an authentication challenge in a polling message and indicates a communication error if the challenge is not responded to correctly.

In one embodiment, the local area interface communicates with a manually-activated security alert device, and the processor automatically generates a security alert report message in response to manual activation.

In another embodiment, the local area interface treats a mobile device which transmits a security code as the wireless security alert device.

In a further embodiment, the system further comprises a tracking gateway for receiving report messages from the tracking proxy.

In one embodiment, the tracking gateway communicates with a plurality of distributed tracking proxies.

In another embodiment, the tracking gateway uploads tracking information based on received report messages to a tracking application.

In a further embodiment, the tracking gateway routes the tracking information via multiple redundant routes.

In one embodiment, the tracking gateway regularly polls the tracking proxies.

In another embodiment, the tracking gateway includes an authentication challenge to each proxy, and indicates an error if a challenge is not responded to validly.

In a further embodiment, further comprises a local control terminal and the processor receives status and event data at said terminal and uses said data to generate the report messages.

In one embodiment, status and event messages transmitted by container monitoring devices are displayed on the local control terminal.

In another embodiment, the local control terminal has an interface for directly interrogating the monitoring devices.

In a further embodiment, the local control terminal is a hand-held device which communicates via a mobile network.

In one embodiment, the proxy is located on a craft having a dedicated mobile network, and the local control terminal communicates in this network.

In another embodiment, the processor dynamically chooses a route for a report message upload according to nature of an event included in the report message.

DETAILED DESCRIPTION OF THE INVENTION

Brief Description of the Drawings

The invention will be more clearly understood from the following description of some embodiments thereof, given by way of example only with reference to the accompanying drawings in which:—

DESCRIPTION OF THE EMBODIMENTS

Figure 1:
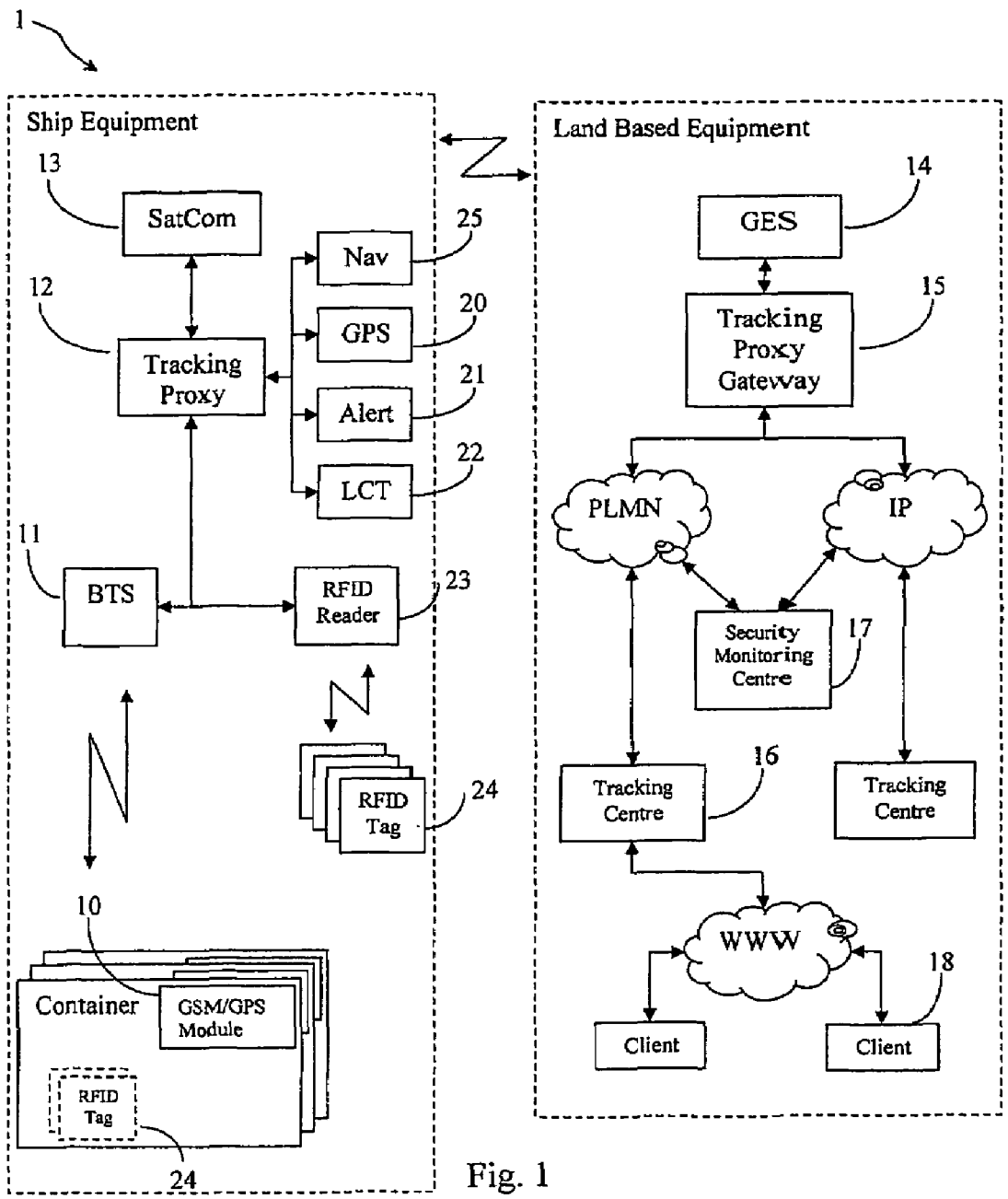
FIG. 1 is a diagram illustrating an on-board communication system of the invention.

In the invention, position of containers with monitoring devices can be tracked with use of a movable cellular network of a vehicle transporting the container. The movable network provides GSM (SMS and GPRS) coverage within the ship and is linked to terrestrial GSM networks using satellites. The containers can thus be monitored continuously from one location to another.

In summary, an on-board satellite connected pico-network includes a tracking proxy. The role of the tracking proxy is to capture data from monitoring devices and generate report messages for enhanced information exchange with a tracking centre. For example, if a monitored container located deep in the ship's hold cannot "see" GPS satellites, then the tracking proxy can insert location information into a report message transmitted to the tracking centre. The report messages are transmitted to a tracking proxy gateway, the role of which is to enhance the information flow between several craft-borne tracking proxies and the tracking centres or security monitoring centres.

The on-board system which is primarily used to track and monitor containers can also be used to track the ship itself. The tracking proxy 12 is capable of generating SMS messages containing location information and other events and data related to the ship. This functionality can be used to fulfil Long Range Tracking and Identification (LRIT) requirements.

Where newer packet-based technologies such as GPRS are available these technologies can be used to exchange IP packets in conjunction with or instead of SMS by the same terminals.

This tracking proxy 12 enhances the SMS message stream in particular where GSM coverage has been extended to cover containers in ships, ports and other areas not covered by conventional terrestrial GSM networks within the confines of international radio regulations and legislation.

Referring to FIG. 1 a communication system 1 of the invention comprises:

10: A number of containers are equipped with monitoring devices, namely GSM/GPS modules which report information on a regular basis over a GSM air interface using SMS or GPRS channels. These monitoring devices may be equipped with RFID tag readers which allow communication with RFID tags 24 inside the containers.

11: An on-board BTS and its associated antenna system provide GSM radio coverage to all locations on the ship where containers can be stored.

12: An on-board tracking proxy between the BTS 11 and a satellite communications system 13 allows SMS messages from the container modules 10 to be intercepted and used to generate report messages for upload. The tracking proxy 12 also supports interfaces to a GPS receiver 20, a manually activated alert system 21 and a local control terminal 22 used to manage the on-board equipment. It uses inputs from the GPS receiver 20 to insert location data in the report messages.

13: An on-board conventional satellite communications system ("SatCom") which provides a data link between the ship and the land based equipment. This is used by the proxy 12 to upload the report messages to the gateway 15.

14: A ground earth station (GES) which is the land-based counterpart of the on-board SatCom system 13.

15: A fixed tracking proxy gateway between the GES 14 and the conventional land-based networks such as GSM networks (PLMN) or IP networks. This receives report messages from multiple distributed tracking proxies 12, and routes corresponding tracking information to various systems.

16: A number of tracking centres which send and receive messages to and from the container monitoring devices and which host tracking applications used to monitor the containers' status and location.

17: A number of security monitoring centres which receive security-related messages from the gateway 15.

18: A number of tracking application clients which typically access tracking data through Internet portals supported by the tracking centres 16.

20: A GPS receiver or an existing on-board navigation system 25 used to indicate location, speed, heading and other relevant information to the tracking proxy 12. This data is used by the proxy 12 to enhance the "value" of the report messages.

21: A manually activated alert system. This may be hard-wired. Alternatively, it may be a conventional mobile phone programmed to transmit an alert code.

22: A local control terminal for operation and maintenance of the tracking proxy 12.

23: An RFID tag reader used to communicate with RFID tags 24 on the craft.

System Operation

Each container is equipped with one or more GSM/GPRS modules 10 which interface with sensors in the container and a container GPS receiver for location monitoring. The sensors typically monitor parameters including:

Container door status. The GSM module logs all door opening and closing and can be configured to report door activity either periodically or when a door event occurs. Attempts to remove doors in an effort to open the container without breaking the seal will also cause the door event to be generated.

Container temperature. The GSM module logs temperature changes and can be configured to report these changes periodically or immediately when a pre-defined temperature threshold is reached.

Container location. The GPS receiver sends location information to the GSM module periodically or on-demand. This location information is reported by the GSM module either periodically or when the location changes by a configurable amount.

Speed detection. The GPS module 10 indicates speed at each location update, and the speed can be monitored and logged. If the speed exceeds a configurable threshold an alarm can be reported.

Container humidity. The GSM module 10 logs humidity changes and can be configured to report these changes periodically or immediately when a pre-defined humidity threshold is reached.

Container power status. Refrigerated containers are usually powered by a built-in generator or by batteries or by an external power source from the ship.

GSM/GPS module battery. The GSM/GPS module 10 is typically powered by one or more dry cell batteries. The module monitors the battery voltage and reports an alarm when the battery level falls to a configurable level.

Tamper indication. If any of the on-board container equipment is tampered with the GSM module sends an immediate indication (alarm) to the tracking centre.

Breaking of electronic or physical seals.

Shock detection, if a container falls or is dropped an accelerometer can detect the shock level which is logged and reported by the GSM module.

Pressure, container pressure can be logged and reported as described above for temperature and humidity. This applies particularly to containers carrying liquids or gases.

Radiation detection, used to monitor nuclear radiation levels within or outside the container.

Gas detection, used to monitor concentration levels of different gases in the container.

Chemical, biological and nuclear weapons detection.

RF identity tags (RFID tags) are widely used on containers for identification and tracking of containers. The GSM module 10 can be equipped with an RFID tag reader that reads data from the tag and sends this data to the tracking centre periodically or on demand.

GSM coverage. The GSM module 10 can be configured to report changes in received signal strength which can give an indication that the container is moving out of range of the GSM network; The GSM module 10 can record and log start and end times of GSM coverage. This will also record any reduction in the output power of the GSM network caused by incorrect configuration, system faults, accidental damage or tampering. By examining the log one can determine if the GSM module has been out of coverage and for how long.

GPS coverage, with each location update the GPS receiver indicates the number of satellites that are visible. This gives an indication of the quality and accuracy of the location information. This information can be used by the GSM module to report diminishing GPS coverage or total lack of GPS coverage.

Deviation from the planned route; route information including way-points and schedule can be downloaded to the tracking proxy 12 and an event will be generated if the ship deviates from the route or misses schedules.

The tracking proxy 12 generates report messages on the basis of information received from the monitoring devices 10 and possible also some RFID tags 24 via the reader 23. The following is an example of a tracking and status message as it would appear between a device 10 and the tracking proxy 12:

| SMS Header | Lat | Long | UTC | Fix | Sat | Status | A/D - 1 | A/D - 2 |
| --- | --- | --- | --- | --- | --- | --- | --- | --- |

SMS Header: Routing information for the message
Lat: latitude
Lon: Longitude
UTC: Time stamp
Fix: GPS fix quality; 0 = invalid, 1 = GPS fix, 2 = Differential GPS fix.
Sat: Number of satellites used for the fix.
Status: 1 bit per discreet input, e.g. door open, refrigeration failure
A/D: Analog to digital converter, e.g. temperature sensor Once processed by the tracking proxy, the message that is forwarded to the tracking gateway 15 has the following format where the tracking proxy 12 has replaced invalid location data with valid data and appended its own identifier:

| SMS Header | Lat | Long | UTC | Fix | Sat | Status | A/D - 1 | A/D - 2 | TP - Id. |
| --- | --- | --- | --- | --- | --- | --- | --- | --- | --- |

SMS Header: Routing information for the message, modified by the tracking proxy is the SMS is to be routed to a different or multiple destinations.
Lat: latitude; Replaced by the tracking proxy Latitude if the original fix data is invalid.
Lon: Longitude, Replaced by the tracking proxy longitude if the original fix data is invalid.
UTC: Time stamp
Fix: GPS fix quality; 0 = invalid, 1 = GPS fix, 2 = Differential GPS fix, 3 = Tracking Proxy fix.
Sat: Number of satellites used for the fix. Inserted by the Tracking Proxy if Fix = 3.
Status: 1 bit per status input, e.g. door open, refrigeration failure
A/D: Analog to digital converter, e.g. temperature sensor
TP-Id.: Identity of the Tracking proxy The tracking proxy 12 may alternatively consolidate data from many devices 10 to generate a summary report message of much lower bandwidth. Report messages could also be generated by the tracking proxy 12 in response to local terminal 22 inputs. To achieve this, a crew member can enter a container's identity and the relevant parameters on the local control terminal 22.

Optionally, a container can be fitted with more than one module. This provides higher reliability for high value containers and gives better tamper detection. If, for example, two modules 10 are fitted they can be configured to monitor each other using a continuous heartbeat message. A module 10 will report an alarm if the other module 10 does not respond to the heartbeat. Heartbeat messages can also be exchanged between the container modules 10 and the tracking proxy 12. If the tracking proxy 12 does not receive a heartbeat within a configurable time-out it can send an alert message to the relevant tracking or security monitoring centres.

Reporting frequency and thresholds for the parameters listed above can be configured remotely by the tracking applications in the tracking centres 16 or by the tracking proxy. This is achieved by sending a configuration message to the container's GSM module 10 using either SMS or IP over GPRS channels.

When a container module 10 has an event to report an SMS message is sent through the on-board BTS 11 to the tracking proxy 12. The tracking proxy 12 generates a report message and uploads it to the tracking proxy gateway 15 over the satellite link.

Either the tracking proxy 12 or the tracking proxy gateway 15 can insert information such as location coordinates before forwarding on the message. The tracking proxy 12 or the tracking proxy gateway 15 can also decide if the message needs to be routed to one or more additional tracking centre or security monitoring centre and if so, create a copy of the message for the other centre. This is of particular use when tracking security-sensitive containers which need to report urgent events such as door opening or tamper detection to the relevant authorities. The decision on which centres need to receive the message may depend on information such as the current location or local regulations. Typically, the security message will be sent to a security monitoring centre in the flag state of the ship, destination port/country or nearest country. This information can be configured on the tracking proxy 12 locally or remotely. SMS and/or other messaging protocols-may be used to send the message to the tracking or security monitoring centre. Alternatively this routing function can be implemented in the GSM modules or in the tracking centres.

The GSM modules 10 can be configured over-the-air with the addresses of the relevant tracking centres or security monitoring centres. This remote configuration of the modules can be done either by the tracking proxy or by the tracking/security centre.

The initial messages from the modules 10 and/or any other messages generated by the tracking proxy 12 can be displayed on the LCT 22 screen. This allows personnel on the ship to monitor container parameters and intervene directly if necessary. The LCT 22 also allows crew members to enter status and events on behalf of containers which are either not equipped with tracking devices or whose tracking devices are faulty. The address to which these manually entered messages are sent is usually entered for each container on the ship's manifest. If not, the proxy can be configured with a default destination address such as the shipping company's address. The LCT 22 can also display messages received form the tracking centres 16 or security monitoring centres 17.

Optionally, the tracking proxy 12 may have access to an electronic copy of the ship's manifest. This can be used to cross check containers that have location updated with those declared on the manifest. Any mis-match between containers declared and containers sending location updates causes the tracking proxy 12 to send an alert report message.

The tracking proxy 12 has an interface to a manually activated alarm system. This allows crew members to send an alert to a security monitoring centre in case of an emergency such as a hijacking attempt The crew member activates the alarm typically by pressing a concealed button or by using a wireless device such as a cellular phone. The tracking proxy 12 sends a predefined SMS report message to the designated security centre without generating any indication on the ship that the alert has been raised. This functionality fulfils SOLAS "Ship's Security Alert System" requirements.

Messages arriving at the tracking centre are logged to provide a historical report of events for each container and the relevant personnel alerted when important events occur that need human intervention. The tracking proxy 12 and tracking proxy gateway 15 can also log messages to provide a level of redundancy in the event of a tracking centre or security monitoring centre becoming unreachable.

The tracking proxy 12 is also capable of monitoring tracking devices locally. The tracking devices can report status to the tracking proxy 12 periodically or can be polled periodically by the tracking proxy 12. The tracking proxy 12 will only send an indication to the tracking proxy gateway 15 or other monitoring centre when an exception such as door opening occurs. This allows the system to check the status of the containers very frequently with using satellite bandwidth unnecessarily.

In cases where the tracking application needs to monitor many containers on a ship and ensure that the tracking proxy 12 is operational and continuously accessible, the tracking proxy 12 can send a summary status report to the tracking application on a regular basis. For example, 100 containers can be polled every 60 seconds on a ship and a single summary status report can be sent to the tracking application every 60 seconds giving a 100:1 saving on satellite cost while ensuring that contact is made with each container and the tracking proxy every 60 seconds. Records of locally exchanged monitoring messages can be sent to the tracking proxy gateway to enable billing records and statistics to be generated for the local traffic. Polling of the modules may involve the proxy 12 presenting an authentication challenge and automatically generating an error report message if the challenge is note responded to correctly.

On-board GSM systems and the land-based OSM coverage ensures that the GSM modules 10 on the container can communicate with tracking centres in almost all circumstances. In the rare cases where GSM coverage is not available, small hand-held radio devices emulating a GSM BTS and the tracking proxy 12 can communicate with the module in the container to read the current status of the monitored parameters and to configure the GSM module reporting scheme.

The GSM modules can be optionally equipped with a short range radio unit (e.g. WLAN 802.11 or Bluetooth) which allows GSM modules 10 in a container or in different containers to communicate with each other by establishing a local ad-hoc network. This allows peer-to-peer monitoring of the GSM modules 10 and provides an alternative communications path between a particular container and the GSM network. Optionally, the tracking proxy can have an 802.11 or similar access point connected to it so that it can communicate directly with these modules using these short distance radio links.

The tracking proxy 12 and tracking proxy gateway 15 can be monitored and configured locally using the LCT 22 or remotely from a conventional operations and maintenance centre. The tracking proxies 12 and tracking proxy gateways 15 monitor the status of the satellite link continuously and are configured to send alarm messages to the tracking centres or security monitoring centres. Tracking proxies and tracking proxy gateways are capable of generating billing records for post-processing in a billing centre if needed.

Also, the gateway 15 generates an authentication challenge to each of its proxies 12, and generates an error report message if a challenge is not met. It also generates an error message if a regular polling signal is not responded to.

The invention is not limited to the embodiments described but may be varied in construction and detail. For example the BTS could support other radio protocols including but not limited to the following:

CDMA (IS95) and evolutions of CDMA (CDMA 2000, CDMA 20001X etc)
UMTS and evolutions of UMTS
Evolutions of GSM such as GPRS, HSCSD, EDGE
TDMA
TD-SCDMA
Wireless LAN, RFC 802.11
Bluetooth
RFID wireless protocol Another variation is that the invention could be used on any craft, land borne, sea borne, air borne and may also be deployed on land based networks.

The invention claimed is:

1. A tracking system comprising a tracking proxy, said proxy comprising:
    a local area interface for communication with at least one container monitoring device in a wireless local area associated with the proxy,
    a processor for receiving monitoring device data and using it to generate a report messages, and
    a remote communication interface for loading the report message to a remote host;
    the processor inserting geographical location data in the report message;
    the processor performing bi-directional communication with a monitoring device;
    the processor performing remote configuration of a monitoring device; and
    a tracking gateway for receiving report message from the tacking proxy, the tracking gateway uploading tracking information based on received report messages to a tracking application, the tracking gateway route the tacking information via multiple redundant routes.

2. The tracking system as claimed in claim 1, wherein the tracking gateway communicates with a plurality of distributed tracking proxies.

3. The tracking system as claimed in claim 1 wherein the tracking gateway communicates with a plurality of distributed tracking proxies; and wherein the tracking gateway regularly polls the tracking proxies.

4. the tracking system as claimed in claim 3, where the tracking gateway includes an authentication challenge to each proxy, and indicates an error if a challenge is not responded to validly.

5. A tacking system comprising a tracking proxy, said proxy comprising:

a local area interface for communicating with at least one container monitoring device in a wireless local area associated with the proxy, a processor for receiving monitoring device data and using it to generate a report message, and a remote communication interface for loading the report message to a remote host;

wherein the processor insert geographical location data in the report messages;

wherein the system comprises a location monitoring device, and the processor determines said location data using input from the location devices; and the processor dynamically choosing a route for a report message upload according to nature of an included in the report message.

* * * * *

UNITED STATES PATENT AND TRADEMARK OFFICE
CERTIFICATE OF CORRECTION

PATENT NO. : 7,652,568 B2  Page 1 of 1
APPLICATION NO. : 11/418109
DATED : January 26, 2010
INVENTOR(S) : Waugh et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 503 days.

Signed and Sealed this

Twenty-third Day of November, 2010

David J. Kappos
*Director of the United States Patent and Trademark Office*